L. S. STARRETT.
HACKSAW.
APPLICATION FILED AUG. 2, 1915.
1,259,799.
Patented Mar. 19, 1918.
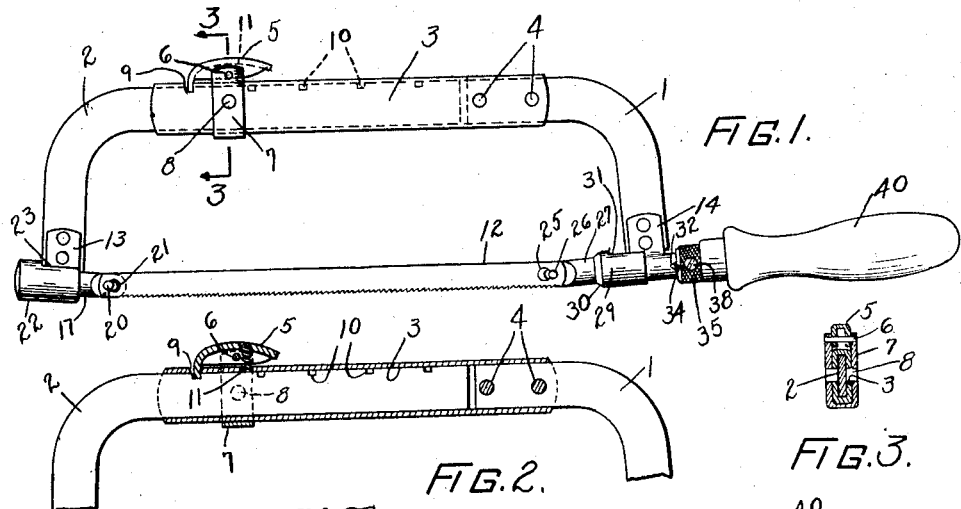
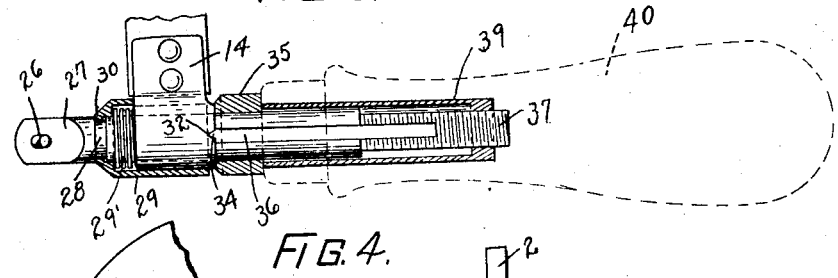
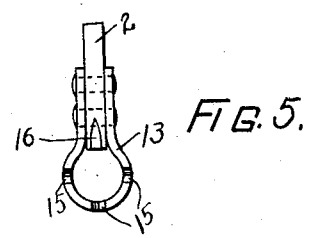
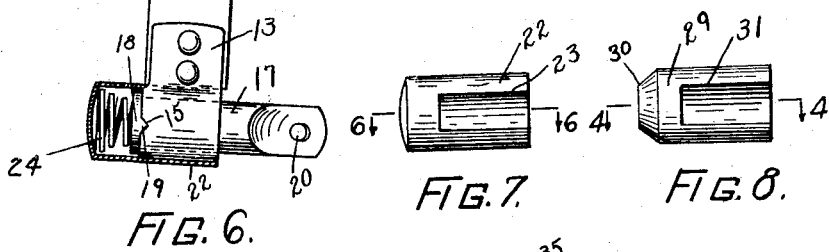
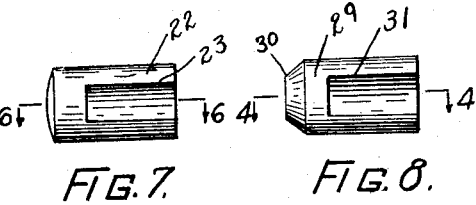
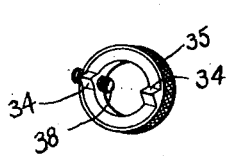
INVENTOR
LAROY S. STARRETT
BY Ellis Spear Jr.
ATTORNEY

UNITED STATES PATENT OFFICE.

LAROY S. STARRETT, OF ATHOL, MASSACHUSETTS, ASSIGNOR TO THE L. S. STARRETT COMPANY, OF ATHOL, MASSACHUSETTS, A CORPORATION OF MASSACHUSETTS.

HACKSAW.

1,259,799.   Specification of Letters Patent.   Patented Mar. 19, 1918.

Application filed August 2, 1915.   Serial No. 43,107.

*To all whom it may concern:*

Be it known that I, LAROY S. STARRETT, a citizen of the United States, residing at Athol, county of Worcester, Commonwealth of Massachusetts, have invented certain new and useful Improvements in Hacksaws, of which the following is a specification.

This invention relates to hack saws and has for its object to provide a strong, rigid and readily adjustable saw of this class. Specifically the present invention contemplates certain improvements in the blade locking devices which detachably lock the saw blade to the ends of the frame members whereby the insertion and removal of a blade may be readily effected without losing the adjustment of the blade holding spindles and locking devices therefor. This is secured in the present invention by an arrangement of slotted thimbles on the bearings at the ends of the frame sections and a pair of coil springs associated therewith and operating to maintain the handle and adjacent blade locking spindle and the opposite spindle in their proper positions during interchange of the saw blades.

The construction and operation of my invention will be more fully disclosed in the specification which follows. In the drawings forming a part of that specification I have shown a hack saw which not only clearly illustrates the principles involved but is in itself a form found satisfactory in use and well adapted to the requirements of manufacture.

Throughout specification and drawings like reference numerals are correspondingly applied, and in these drawings:

Figure 1 is an elevation of a hack saw frame in accordance with my invention.

Fig. 2 is a longitudinal sectional view of the backing or coupling member of the frame.

Fig. 3 is a transverse section thereof on the line 3—3 of Fig. 1.

Fig. 4 is an enlarged section through the handle, on the indicated plane 4—4, Fig. 8.

Fig. 5 is an end view of the adjustable section of the two part frame.

Fig. 6 is a detail view partially in section of the blade carrying end of the adjustable frame section on the indicated plane 6—6 of Fig. 7.

Fig. 7 is an elevation of the thimble shown in Fig. 6.

Fig. 8 is an elevation of the thimble shown in Fig. 4, and

Fig. 9 is a perspective view of the locking ring for the handle carrying frame section.

In carrying out my invention the handle carrying section 1 and the adjustable sliding section 2 of the U-shaped saw frame are adjustably connected with each other by a tubular closed sided coupling member 3. The member 3 as clearly indicated in Fig. 3 is a simple length of tubing open at both ends and having in the embodiment herein selected as illustrative of the principles of my invention a substantially rectangular appearance in cross section. Near one end, the coupling 3 is riveted or otherwise fixedly connected to the section 1 as indicated at 4. The coöperating frame section 2 is telescopically received in the coupling 3 and may be locked therein at the proper degree of separation from the section 1 by any desired locking mechanism. In the form shown, this locking device consists of a spring controlled self-locking pawl 5 pivoted at 6 above the top face of the coupling and rigidly fastened thereto near the free end thereof by any suitable fastenings 8.

The toe of the pawl is exposed to the top face of the adjustable frame section 2 through a slot 9 cut across the top face of the coupling 3 and may be selectively engaged with any notch of a longitudinal series of notches 10 formed along the top face of the section 2 whereby to lock said section in adjusted position. The pawl is normally maintained in engagement with the notches by a coil spring 11 interposed between the heel of the pawl and the top face of the coupling 3 and compressed when the thumb is applied to said heel to rock the pawl on its pivot and withdraw the toe thereof from a notch.

This construction of coupling and locking device provides a rigid, strong, and conveniently operable connection for the frame sections which braces the frame sections on all sides and particularly on the under side which heretofore has been open and unbraced. The tubular form of coupling permits the adjustable section 2 to be withdrawn by a straight sliding movement away from the fixed section. It will be observed that the section 2 is guided in this sliding movement by the sides of the coupling. It will also be observed that the fulcrum of the pawl is above the toe portion thereof. This prevents the toe from rising and becoming unlocked while the saw blade is strained to tension because of the locked condition of the two frame members. The tension must therefore be taken off the saw before the pawl can be unlocked. The rough adjustment of the frame sections relative to each other is thus secured, and this adjustment is held by the pivoted pawl 5.

The fine adjustment of the frame sections and the straining of the saw blade 12 to tension is secured in the following manner. Each frame section at the lower end of its bowed portion has secured to it a cylindrical bearing 13—14. The bearing 13 on the section 2 has a plurality of peripheral notches 15 at one end and the end of the frame section itself has a vertical notch 16 on its far face, (see Fig. 5).

Mounted in the bearing 13 is a blade locking spindle 17 terminating at one end in a head 18 provided with one or more locking projections 19 adapted for engagement with the notches 15—16. The opposite end of the spindle is reduced as shown and is provided with an inclined pin 20 adapted for locking engagement with a slot 21 in one end of the saw blade 12.

Fitted over the bearing 13 is a thimble 22 having a slot or cut out 23 in one face to permit it to be brought up close against the lower end of the frame section 2.

Confined within the thimble between its closed end and the head 18 of the spindle 17 is a coil spring 24 which is normally effective to maintain the projections 19 on the head in engagement with the notches 15—16, thus holding the adjustment of the spindle when the saw blade is removed.

The saw blade is detached from the frame section 2 by simply disengaging pin 20 from slot 21. This involves a slightly rearward movement of the spindle 17 against the spring 24, the spring operating to hold the projections 19 of the head 18 in engagement with the notches 15—16 thereby preventing turning of the spindle in the bearing and consequent loss of the adjustment. As soon as the pressure on the spindle is removed, the spring returns it to its former position.

The opposite end of the saw blade 12 has a slot 25 in which fits an inclined pin 26 carried by the reduced portion of a blade clamping spindle 27 fitted in the bearing 14 on the end of the frame section 1. The spindle 27 beyond its reduced portion is circumferentially grooved as indicated at 28 and one end of a thimble 29 somewhat similar to the thimble 22 is spun over and swaged on to the spindle as indicated at 30 to engage said groove. Spindle and thimble are therefore fast on each other. The thimble is slotted along one face as indicated at 31 to permit it to move up close against the frame end 1. Between the collar portion 30 and the adjacent end of the bearing 14 a coil spring $29^1$ is confined.

One end of the bearing 14 has a peripheral series of locking notches 32 and the frame end 1 has a vertical notch corresponding to the notch 16 in the frame section 2. These notches coöperate with one or more projections on a knurled locking ring 35 set on the spindle.

The spindle beyond the thimble 29 is provided with a longitudinal groove 36 extending well up toward the reduced threaded end 37 thereof. The ring 35 has a laterally disposed screw 38 through one side thereof entering said groove and serving to prevent independent turning movement of the ring on the spindle. The rear end of the spindle is guided and has bearing in an opening through the rear wall of a sleeve 39 fixed in the bore of a handle 40.

In assembling this part of my invention the spindle and thimble 29 are run through the bearing 14 from left to right in the showing of Fig. 4 with the thimble properly positioned on the spindle whereby to bring its slot 31 in alinement with the frame end 1. The ring 35 is then run on the opposite end of the spindle with its stud 38 disposed in the groove 36 until its projections 34 engage the notches 32 in the end of the bearing. The handle 40 is then run onto the threaded end of the spindle until its shoulder abuts the ring 35. Further turning movement of the handle causes the spindle to move rearwardly, the stud 38 and projections 34 preventing the spindle turning. This strains the blade 12 to tension. The rearward movement of the spindle draws the thimble 29 rearwardly along the bearing 14 until the closed end of its slot abuts the frame end 1. This compresses the spring $29^1$.

When it is desired to remove the saw blade, the handle 40 is turned in the reverse direction. This releases the spindle and removes the compression from the spring $29^1$, the tendency of which is now to force the thimble, 29, and spindle forwardly, while keeping the notches of the bearing 14 in engagement with the projections 34 of the ring. This prevents the spindle turning with a consequent loss of the adjustment and at the same time relieves the tension on the said blade. The blade may now be removed by simply disengaging the pins 20—25 of the spindles from the holes 21—26 in the ends of the blade.

If it be simply desired to change the position of the saw blade without removing it, it is merely necessary to release the spindle, disengaging the ring 35 from the particular pair of notches 32 which it has engaged and turn the spindle through a part of a revolution, and again engage the projections 34 with the next pair of notches.

Various modifications in the form and construction of my device may obviously be resorted to within the limits of the appended claims.

What I therefore claim and desire to secure by Letters Patent is:

1. In a saw, a frame having alined bearings, thimbles thereon, a spindle movable in one bearing and carrying one of said thimbles, a spring confined between a portion of said thimble and the frame, a spindle in the other bearing and movable relative to the other thimble, a spring confined between a portion of the last-named thimble and spindle, and means coöperating with said springs to normally lock the spindles against movement.

2. In a saw, a frame having a fixed bearing, a blade clamping spindle movable in said bearing and having a threaded outer end, a thimble permanently engaged at one end with said spindle beyond the bearing, a coil spring confined between said end and the adjacent face of the bearing and compressed by the movement of the spindle and thimble in one direction, a locking ring longitudinally adjustable on said spindle, and coöperating with the bearing to normally lock the spindle against movement, means preventing relative rotation of said ring and spindle, a sleeve receiving the threaded end of said spindle, and a rotatable handle in which said sleeve is fixed for moving the spindle longitudinally against the action of the spring.

3. In a saw, a frame having a bearing, a blade clamping spindle movable therein, and provided beyond said bearing with an annular groove, a thimble having a portion permanently interlocked with said groove, a coil spring confined between said interlocking portion of the thimble and the adjacent face of the frame, and means for moving said spindle against the action of said spring.

4. In a saw, a frame having a fixed bearing, a blade clamping spindle movable axially in said bearing, means normally locking said spindle against rotation, a thimble fitted upon said bearing and having a slot permitting the thimble to be moved up against the frame, and a coil spring confined within the thimble and normally urging said spindle locking means into spindle locking relation but yieldable to permit said locking means to be disengaged and the spindle to move longitudinally in said bearing.

5. In a saw, a frame, a pair of straps fastened to the ends of said frame and formed to provide fixed spindle bearings and each bearing having a locking notch in its outer end, a thimble fitted to the outer end of one of said bearings, a spindle extending through said bearing and having a locking head adapted to be engaged with the notch in the outer end of said bearing, a spring confined between said head and the closed end of the thimble and normally maintaining said locking engagement, a thimble fitted to the inner end of the opposite bearing, a spindle set through said bearing, and permanently interlocked with said thimble, a spring confined between the closed end of said thimble and the inner end of said bearing, a ring on said last named spindle having a locking projection to engage the locking notch in the outer end of said last named bearing.

In testimony whereof I affix my signature in presence of two witnesses.

LAROY S. STARRETT.

Witnesses:
 FRANK E. WING,
 ERNEST W. TAYLOR.

Copies of this patent may be obtained for five cents each, by addressing the "Commissioner of Patents, Washington, D. C."